(12) United States Patent
Morris (10) Patent No.: US 7,417,625 B2
(45) Date of Patent: Aug. 26, 2008

(54) METHOD AND SYSTEM FOR PROVIDING INPUT MECHANISMS ON A HANDHELD ELECTRONIC DEVICE

(75) Inventor: Robert P. Morris, Raleigh, NC (US)

(73) Assignee: Scenera Technologies, LLC, Portsmouth, NH (US)

( * ) Notice: Subject to any disclaimer, the term of this patent is extended or adjusted under 35 U.S.C. 154(b) by 655 days.

(21) Appl. No.: 10/834,406

(22) Filed: Apr. 29, 2004

(65) Prior Publication Data

US 2005/0246652 A1 Nov. 3, 2005

(51) Int. Cl.
*G09G 5/00* (2006.01)
(52) U.S. Cl. ............... 345/169; 345/156; 345/168; 345/172; 715/773; 715/778; 715/779
(58) Field of Classification Search .......... 345/156, 345/168, 169, 172; 715/773, 778, 779
See application file for complete search history.

(56) References Cited

U.S. PATENT DOCUMENTS

| | | | |
|---|---|---|---|
| 4,969,647 A * | 11/1990 | Mical et al. ............ 463/31 |
| 5,543,588 A | 8/1996 | Bisset et al. ............ 178/18 |
| 6,369,803 B2 * | 4/2002 | Brisebois et al. ........ 345/173 |
| 6,480,377 B2 * | 11/2002 | Genest et al. ........... 345/169 |
| 6,593,914 B1 * | 7/2003 | Nuovo et al. ........... 345/169 |
| 2002/0172017 A1 * | 11/2002 | Tarnowski et al. ...... 361/730 |
| 2004/0183833 A1 * | 9/2004 | Chua ..................... 345/773 |
| 2004/0183834 A1 * | 9/2004 | Chermesino ........... 345/773 |
| 2005/0091431 A1 * | 4/2005 | Olodort et al. ......... 710/72 |
| 2005/0283729 A1 * | 12/2005 | Morris et al. .......... 715/720 |

* cited by examiner

*Primary Examiner*—My-Chau T Tran (57) ABSTRACT

Reassigning direction-related keys in a handheld device is disclosed. Activation of one of at least two direction-related keys on a rotatable panel of a hand held device is detected, wherein the activation is based on user input for navigating a display of the handheld device. A rotation-based position of the rotatable panel is detected. A different direction is assigned to the direction-related key based on the rotation-based position of the rotatable panel.

11 Claims, 7 Drawing Sheets

Figure 2A
(Back face)

METHOD AND SYSTEM FOR PROVIDING INPUT MECHANISMS ON A HANDHELD ELECTRONIC DEVICE

FIELD OF THE INVENTION

The present invention relates to handheld electronic devices, and more particularly to input mechanisms on a handheld electronic device.

BACKGROUND OF THE INVENTION

Technological improvements in processing speed and power and in memory capacity have opened the door to handheld electronic devices that provide a variety of functions that were heretofore found only in larger and bulkier devices. For instance, manufacturers have been able to shrink the size of a mobile phone to fit in the palm of a user's hand.

While smaller devices are generally perceived to be desirable, a problem arises when the space for physical features of the device diminishes. For example, in most cases, a mobile phone has a minimum number of alphanumeric keys, and additional input keys, e.g., navigation and select keys. These keys are typically located on one face of the device, which also typically includes a display, e.g., an LCD, so that the user can see what he or she has entered, or so that the user can access other functions of the device.

To make room for the input keys and display on the device face, the size of the keys and/or display, and the spacing between keys is usually decreased. Nevertheless, because the keys are so small and the number so many, it becomes difficult to distinguish between the keys. Moreover, even if the user can make such a distinction, it is difficult to press the desired key because the space between keys is so small. For individuals with large fingers, this can be particularly frustrating.

To address this problem, some devices place direction related keys, i.e., navigation keys, on a side surface perpendicular to the device face. Nevertheless, because these handheld electronic devices are slim devices, the side surface is thin and the keys must be positioned in a row along the side surface. Accordingly, navigation keys assigned to allow the user to navigate in a direction perpendicular to the row, i.e., right or left if the keys are on the left or right side of the device, are not intuitive for the user. Other devices offer a touchpad on a backside of the device, i.e., on the surface opposing the device face. (See, e.g., U. S. Pat. No. 5,543,588, entitled "Touch Pad Driven Handheld Computing Device" issued Aug. 6, 1996 to Bisset et al.). Here, the user navigates by tracing his or her finger on the surface of the touchpad to control the movement of a cursor on the display. Nevertheless, compared to input keys, a touchpad is more expensive, consumes more power, and requires more complex programming.

Each of the above described devices presents an additional disadvantage as well. For each device, the location of the navigation mechanism is fixed. Thus, if the user is not comfortable having the navigation mechanism facing away from him or her as the user is viewing the display, the user cannot change the position of the navigation mechanism.

Accordingly, a need exists for a system and method that provides navigation mechanisms, such as input keys, on a handheld electronic device. The system and method should be highly intuitive for the user, while being cost effective and efficient. The present invention addresses such a need.

SUMMARY OF THE INVENTION

The present invention is related to a system and method for providing input mechanisms in a handheld electronic device. In a first aspect, the handheld electronic device according to the present invention includes a casing having a first surface and an opposing second surface, where the first surface includes a display on which a user interface is displayed to a user of the device, a plurality of input keys on the second surface, a layout of the plurality of input keys displayed on the display, and means for allowing the user to enter commands into the device by pressing at least one of the plurality of input keys, whereby the layout allows the user to select an appropriate input key of the plurality of input keys associated with a particular command without viewing the input key.

In a second aspect, the handheld electronic device includes a casing having a first surface and an opposing second surface, where the first surface includes a display on which a user interface is displayed to a user of the device, a hinge mechanism between the first and second surfaces such that the second surface rotates back and forth between a first position and a second position, where the first position is when the second surface is opposing the first surface and facing away from the user, and the second position is when the second surface is substantially co-planar with the first surface and facing the use, at least one input mechanism on the second surface, and means for allowing the user to enter commands into the device by activating the at least one input mechanism.

By locating input mechanisms such as input keys on another surface, i.e., the back face of the device, more or better features can be included on the surface facing the user, i.e., the front face. For instance, because fewer buttons are located on the front face, there is more space available for a larger display. Also, the button arrangement is less cluttered and the spacing between buttons can be increased so that the likelihood of pressing an incorrect button is decreased. When the input mechanisms are facing away from the user, a layout of the input mechanisms is displayed to the user so that the user can activate a desired mechanism.

DETAILED DESCRIPTION OF THE INVENTION

The present invention relates to handheld electronic devices, and more particularly to, input mechanisms on a handheld electronic device. The following description is presented to enable one of ordinary skill in the art to make and use the invention and is provided in the context of a patent application and its requirements. Various modifications to the preferred embodiments and the generic principles and features described herein will be readily apparent to those skilled in the art. For example, while the preferred embodiments are described with respect to a mobile phone, the principles described can also be applied to any handheld electronic device, such as a PDA, digital camera, MP3 Player, and the like. Thus, the present invention is not intended to be limited to the embodiment shown but is to be accorded the widest scope consistent with the principles and features described herein.

The present invention is described with respect to two embodiments. According to a first aspect of the present invention, the total number of input keys cluttered onto a front face of a handheld electronic device, such as a mobile phone, is reduced by locating a plurality of input keys on another surface, such as the back face of the device. A layout of the plurality of input keys is displayed to the user on the front face of the device so that the user can determine the appropriate key to press. By relocating the plurality of input keys onto the back face, the front face can include a larger display, larger input keys and adequate spacing between the remaining input keys, without sacrificing the functionality provided by the plurality of input keys on the other surface. Also, because the plurality of keys are on the back face of the device, the intuitive nature of directional keys can be maintained.

In a second aspect of the present invention, at least one input mechanism, e.g., a plurality of direction related keys and/or a select key, are located on a panel that is hinged to the device in such a manner that the user can "flip out" the panel. For example, in a closed position, the panel (and keys) faces away from the user, and in a completely open position, it faces the user. Unlike conventional "flip" phones, however, the user has access to the plurality of keys in either position so that the user can choose in what position he or she would like to activate the at least one input mechanism. Moreover, in this aspect of the present invention, the device includes a sensor that senses the position of the panel, i.e., whether it is in the open or closed position. The sensor is coupled to an assigner that controls the directional assignment of direction related keys. The assigner ensures that the intuitive nature of the direction related keys is maintained with respect to the user.

Figure 1A:
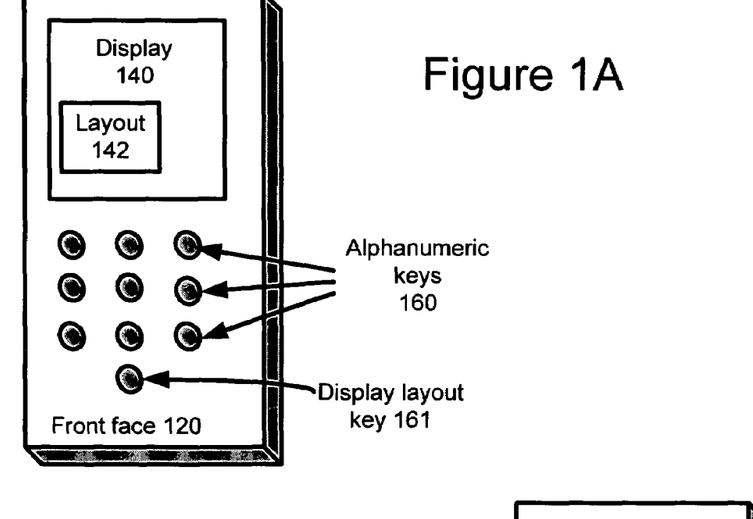
FIGS. 1A and 1B are front and back views, respectively, of a handheld electronic device according to a preferred embodiment of the present invention.
Figure 1B:
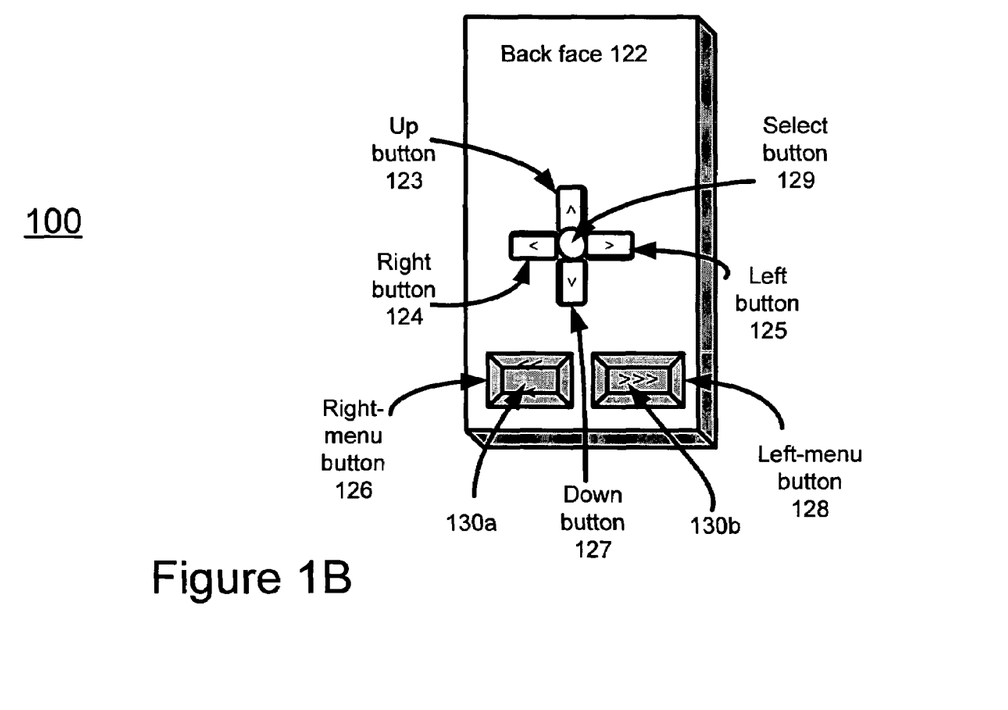

FIGS. 1A and 1B are front and back views, respectively, of a handheld mobile phone according to the first aspect of a preferred embodiment of the present invention. The phone 100 includes a front face 120 and an opposing back face 122. The front face 120 of the mobile phone 100 (FIG. 1A) includes a display 140 and ten (10) alphanumeric keys 160 typical of a phone. The display 140 is used to display a user interface (not shown) that typically includes a menu of functions from which the user can choose.

According to the preferred embodiment of the present invention, input mechanisms including direction related keys 123-128 and non-direction related keys, e.g., a select button 129, are located on the back face 122 (FIG. 1B) of the mobile phone 100. Note that if the input mechanisms were to be located on the front face 120, the size of the display 140 and keys and/or spacing between the keys would necessarily decrease. Thus, by locating the input mechanisms 123-129 on the back face 122, the usability of the phone 100 is significantly improved.

According to the preferred embodiment of the present invention, the directional aspects of the direction related keys 123-128 are correlated to the user's perspective. Thus, the directional aspects are opposite to those viewed from the back face 122. For example, the input key on the left side of the back face 126 corresponds to the user's right when the user is viewing the front face 120, and is assigned to be a right-menu button 126. Similarly, the input key on the right side of the back face 128 corresponds to the user's left when the user is viewing the front face 120, and is accordingly assigned to be a left-menu button 128. When the user presses the direction related key 124 on the left side of the back face 122, this causes a cursor on the display 140 to move to the right from the user's perspective. In this manner, the intuitive nature of the direction related keys 123-128 is maintained from the user's perspective.

In a preferred embodiment, each of the input keys 123-129 includes an embossed pattern 130*a*, 130*b* on a surface touched by the user to assist the user in identifying the key, e.g., 126. To assist further the user, a layout 142 of the input keys 123-129 is displayed on the display 140 (FIG. 1A). With these additional features, the user can operate the input keys 123-129 without having to peek at the back face 122.

In an aspect of the preferred embodiment, the layout 142 is displayed upon request by the user by activating a display layout key 161 located on either the front face 120 or the back face 122 of the device. Alternatively, the input keys 123-129 are responsive to more than one touch pressure, i.e., they are touch-sensitive. A "light" touch at a first pressure indicates a request to display the layout 142, while a "heavy" touch at a second pressure enters a command associated with the input key, e.g., 126. Preferably, to avoid an inadvertent request to display the layout 142, a touch counter (not shown) is used to count the number of times the user applies the light touch to one or more input keys 123-129. Only when the number of light touches exceeds a certain threshold value, e.g., three (3) touches, does the layout 142 display.

Figure 4:
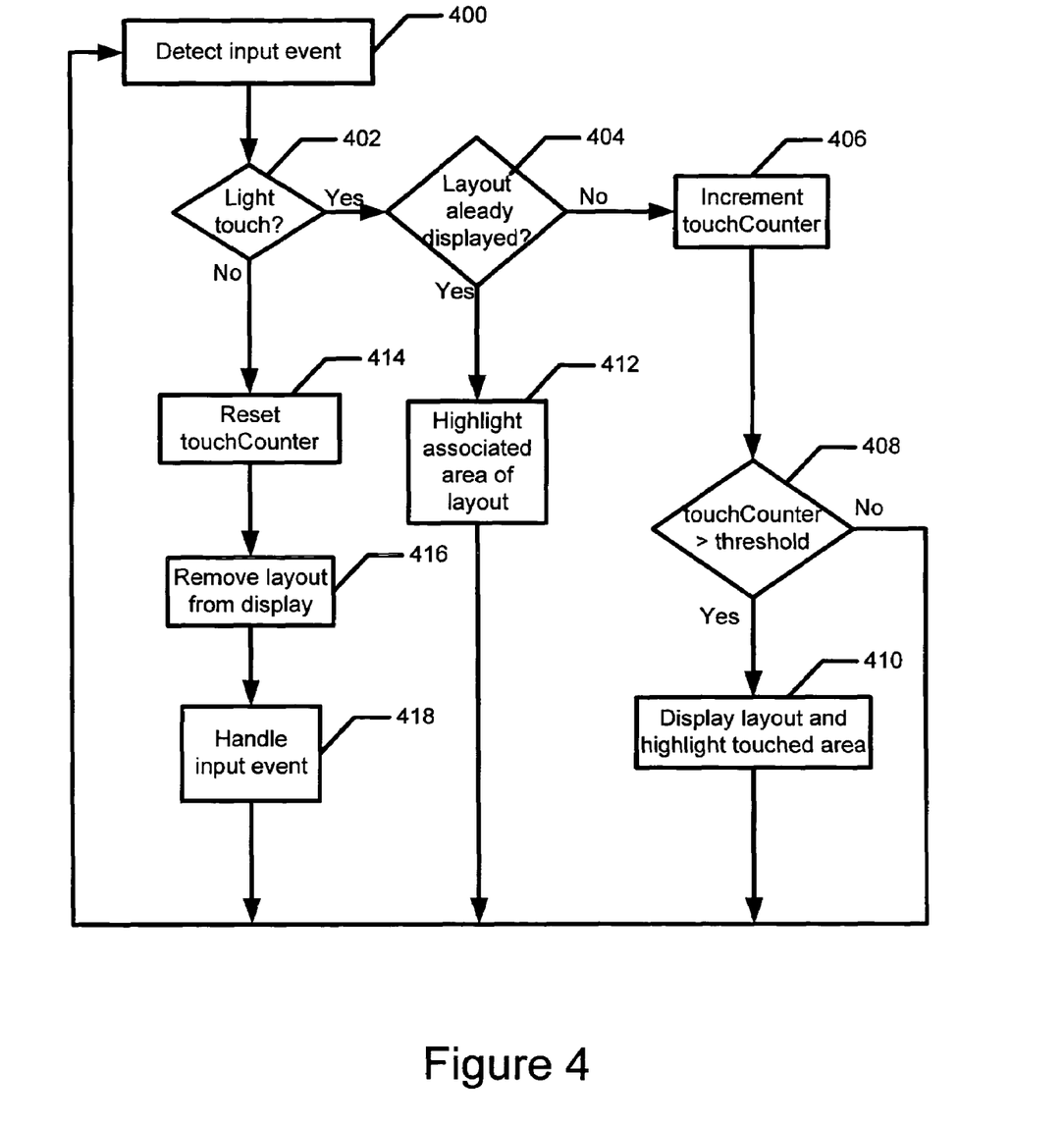
FIG. 4 is a flowchart illustrating a method for displaying the layout of the input keys via touch sensitive keys according to a preferred embodiment of the present invention.

FIG. 4 is a flowchart illustrating a method for displaying the layout 142 of the input keys 123-129 via the touch sensitive keys according to a preferred embodiment of the present invention. Referring to FIGS. 1A, 1B and 4, the process begins when an input event is detected (step 400), i.e., when an input key, e.g., 126, is touched. The device 100 determines whether the input event is a light touch (step 402). If it is, then it is determined whether the layout 142 is already displayed on the display 140 (step 404). If the layout 142 is displayed, then the input key touched 126 is highlighted on the layout 142 (step 412) to indicate to the user which key was touched.

If the layout 142 is not already displayed (step 404), the touch counter (not shown) is incremented (step 406), and if the touch counter exceeds a certain threshold value (step 408), then the layout 142 is displayed and the touched key 126 is highlighted on the layout 142 (step 410). If the touch counter does not exceed the threshold (step 408), the process waits for another input event (step 400).

If the input event is not a light touch (step 402), the touch counter is reset (step 414) and the layout 142 is removed from the display 140 (step 416). Then, the device 100 handles the input event (step 418), i.e., performs the command associated with the touched key 126.

FIG. 4 illustrates one preferred process for controlling the display of the layout 142. Those skilled in the art would readily realize that other methods can be employed. For example, if the layout of the keys occupies a substantial portion of the display 140, the layout 142 can be automatically removed, or the layout 142 can be automatically removed after a period of no activity. Such methods would be within the scope of the present invention.

Figure 2A:
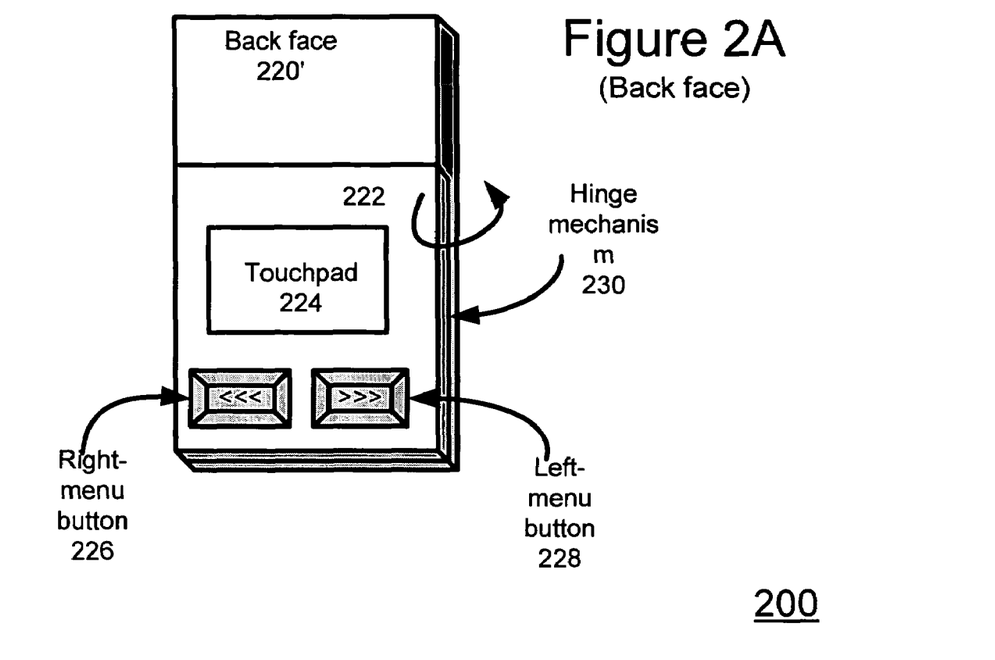
FIGS. 2A, 2B and 2C back and front views of a handheld electronic device according to another preferred embodiment of the present invention.
Figure 2B:
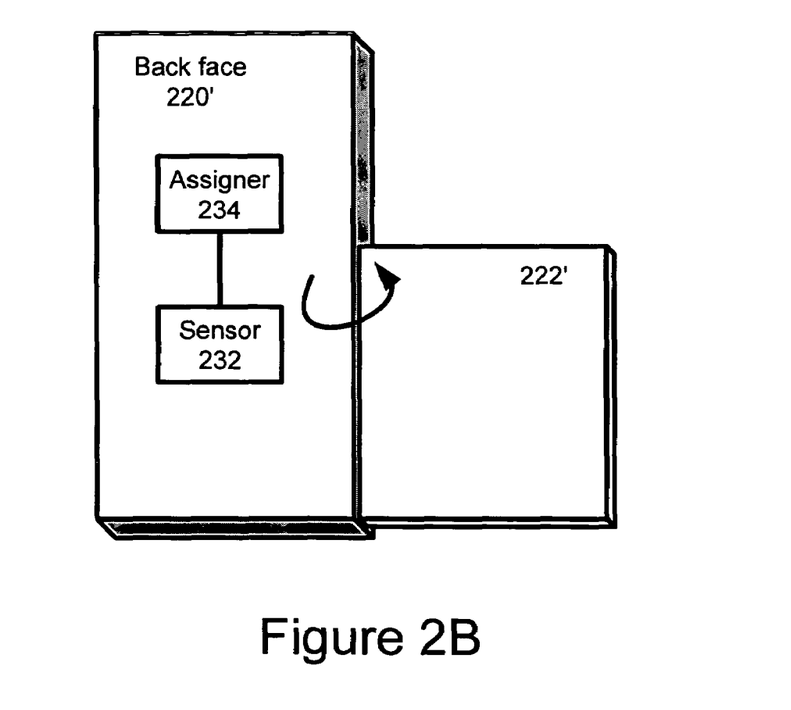

According to a second preferred embodiment of the present invention, the device is provided with a panel containing at least one input mechanism. The panel rotates to and from a first (closed) position and to a second (open) position. FIGS. 2A and 2B are diagrams depicting a back face 220' of a handheld mobile phone 200 according to the second preferred embodiment of the present invention. As is shown, the panel 222 is coupled to the device 200 by a hinge mechanism 230 such that the panel 222 rotates around the hinge mechanism 230 from the closed position (shown in FIG. 2A) to the open position (FIG. 2B) in the direction illustrated by the circular arrow, as shown in FIGS. 2A and 2B. Note that the hinge mechanism 230 can also be located on the opposite side so that the panel 222 rotates in the opposite direction indicated by the arrow.

In a preferred embodiment, input mechanisms, such as a touchpad 224 and direction-related keys, e.g., right and left menu buttons 226, 228, are provided on the panel 222. Notably, the input mechanisms 224, 226, 228 are operational in both the closed and open positions. Preferably, the directional assignments for direction-related keys 226, 228 are dependent on the position of the panel 222. The position of the panel 222 is determined preferably by a sensor 232 located on the back face 220' of the device 200 (FIG. 2B). For example, the sensor 232 can be a contact point that completes a circuit (not shown) when it comes in contact with a back surface 222' of the panel 222, or vice versa. Other methods of implementing the sensor 232 would be readily appreciated by those skilled in the art.

The sensor 232 is coupled to an assigner 234, which controls the directional assignment of the direction-related keys 226, 228 depending on the position of the panel 222, i.e., whether the panel 222 is facing away from the user or toward the user. Note that when the panel 222 is in the closed (first) position (FIG. 2A), the panel 222 is facing away from the user. Accordingly, the key 226 on the left side of the panel 222 is assigned to the right-menu button. Whereas when the panel 222 is in the open (second) position (FIG. 2C), it is facing toward the user and the same key 226 on the left side of the panel 222 is reassigned to the left-menu button.

Figure 2C:
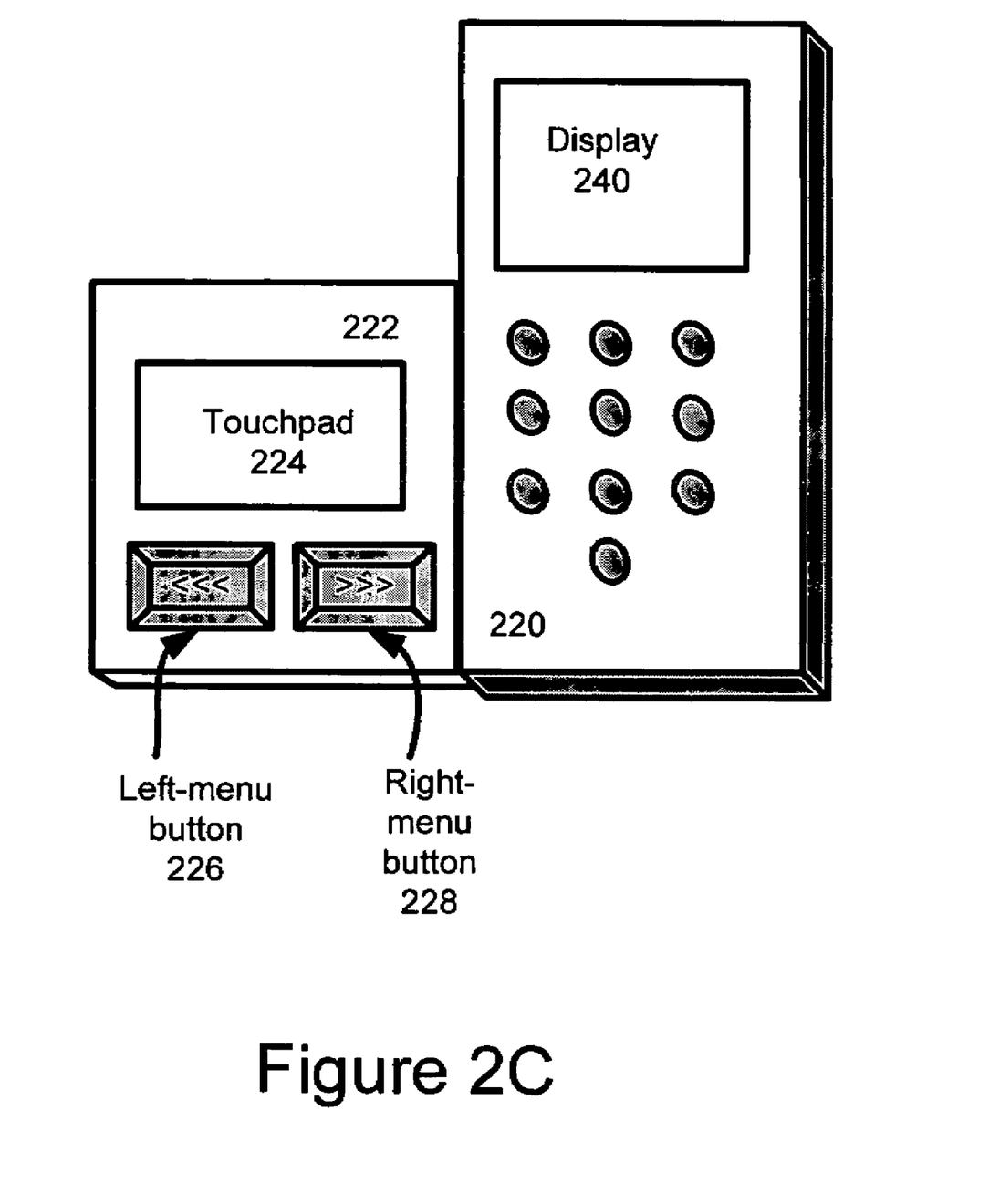

The assigner 234 applies the same adjustment to the directional signals interpreted by the touchpad 224. For instance, when the panel 222 is facing away from the user (closed position), a finger trace from the left side of the touchpad 224 to the right side of the touchpad 224 correlates to the movement of a cursor on the display 240 from the right side of the display 240 to the left side of the display 240. Whereas, when the panel 222 is facing toward the user, the direction of the finger trace corresponds directly with the movement of the cursor on the display 240.

Figure 3A:
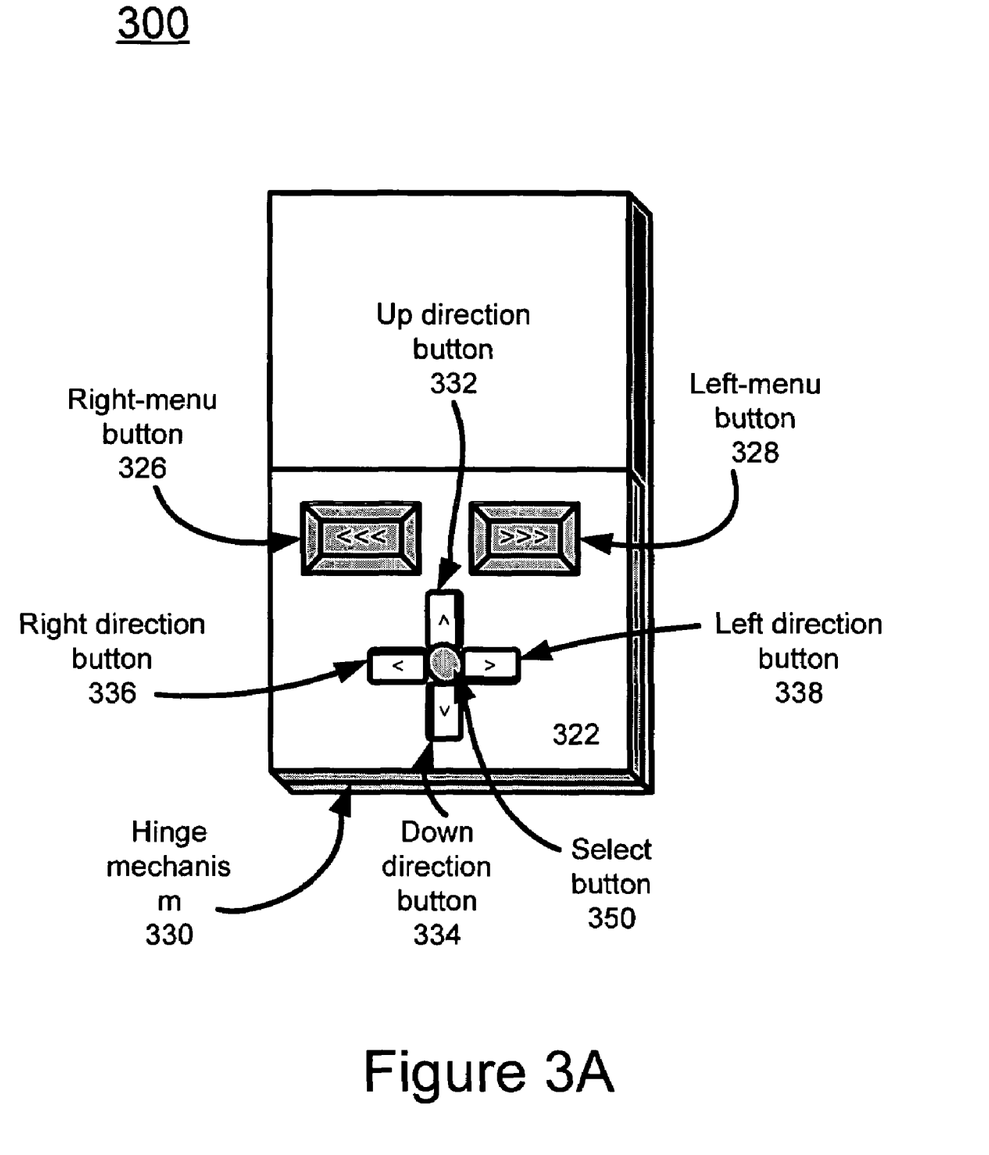
FIGS. 3A and 3B are back and front views, respectively, of a handheld electronic device according to a third preferred embodiment of the present invention.
Figure 3B:
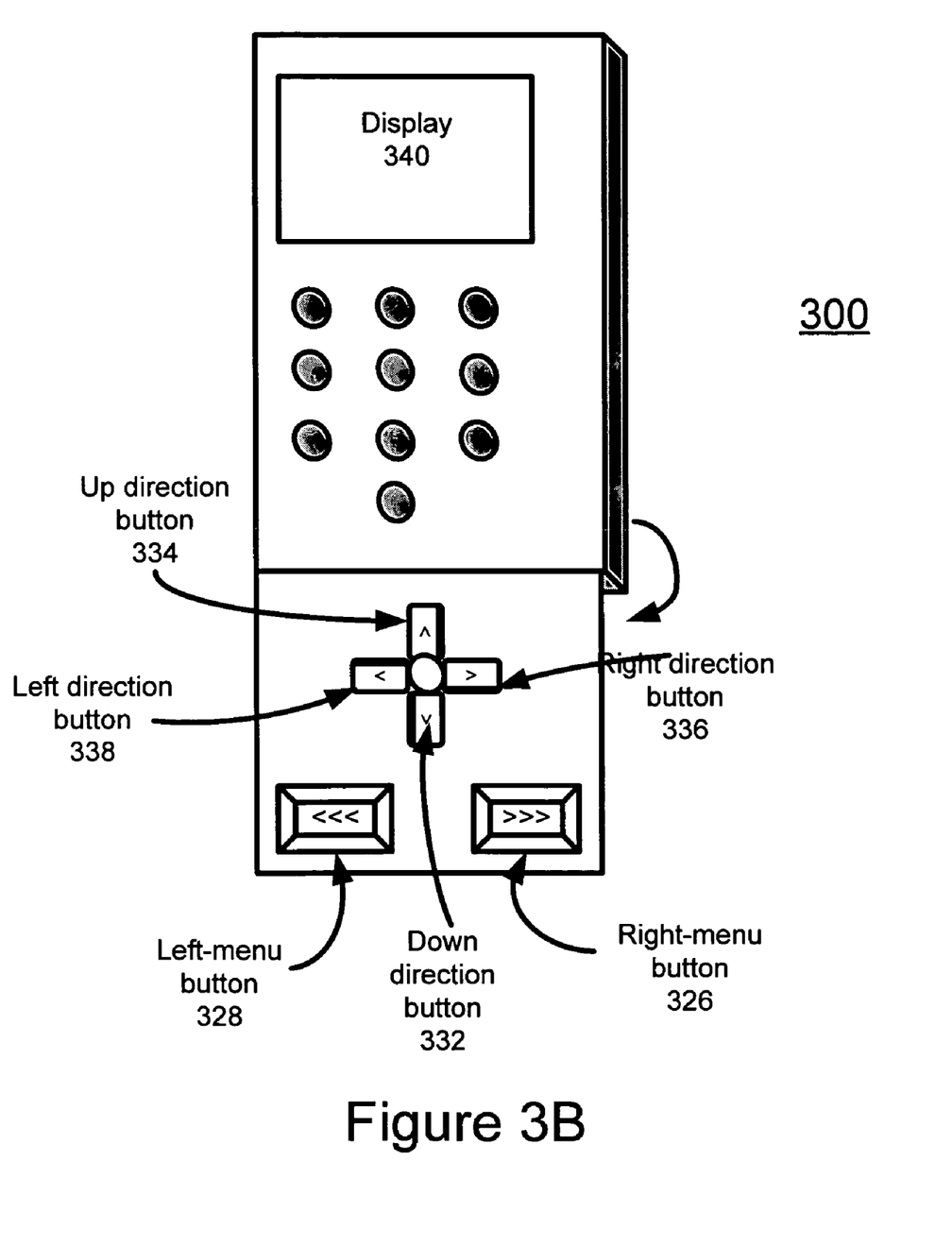

FIGS. 3A and 3B are back and front views, respectively, of a handheld mobile phone according to a third preferred embodiment of the present invention. This embodiment is similar to that illustrated in FIGS. 2A-2C except that the hinging mechanism 330 is located on a bottom side of the phone 300 such that the panel 322 "flips" down, as illustrated in FIG. 3B. Note that the directional assignments for input keys associated with a horizontal direction 326, 328, 336, 338, i.e. left or right, are not affected by the position of the panel 322. Whereas, the assignments for the input keys associated with a vertical direction 332, 334 are dependent on the panel 322 position. While FIGS. 3A and 3B show the hinging mechanism 330 located on the bottom side of the phone 300, it is also possible to locate the hinging mechanism 330 on a top side of the phone 300 such that the panel 322 "flips" up.

Figure 5:
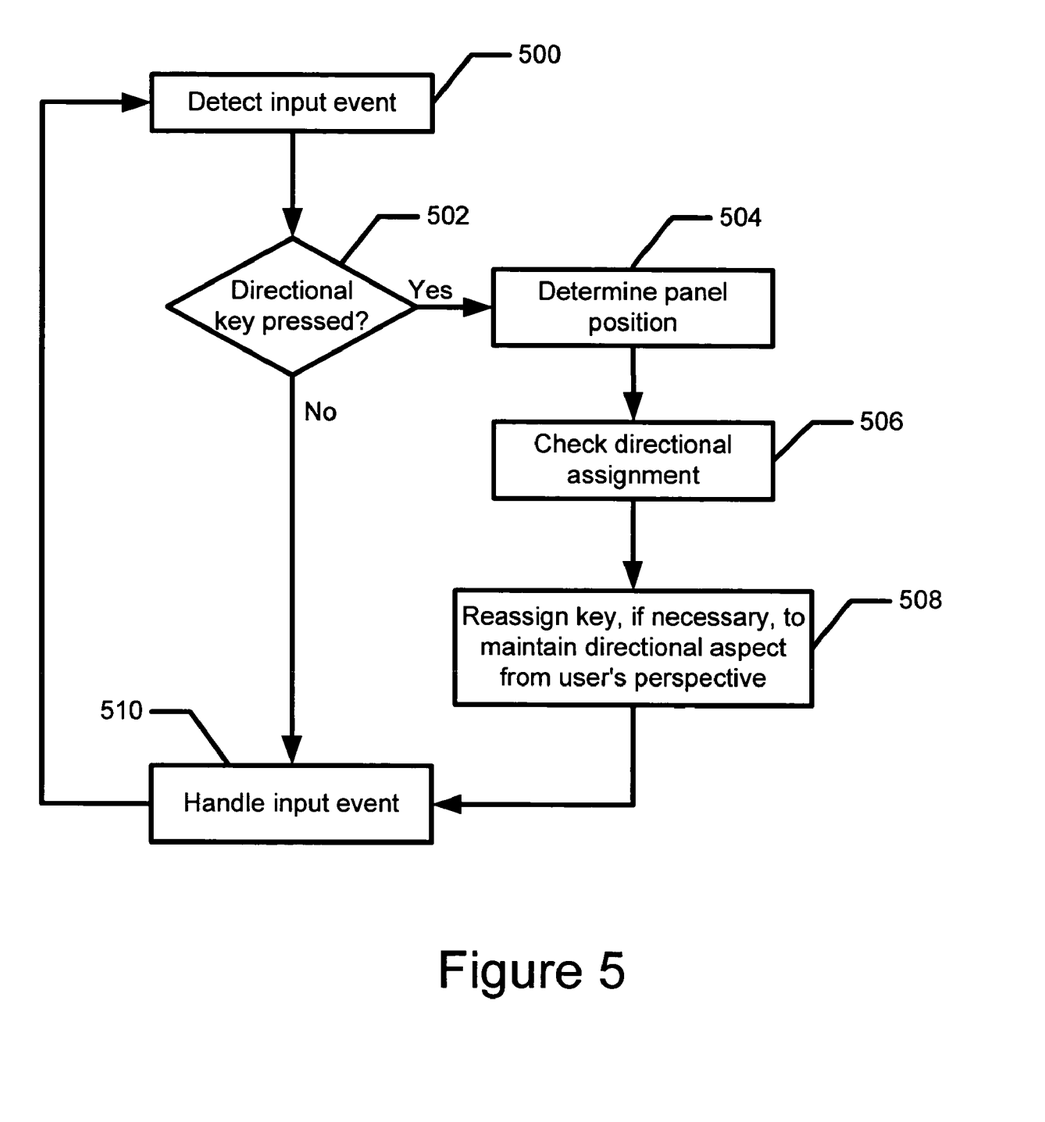
FIG. 5 is a flowchart illustrating a process for reassigning direction related keys according to a preferred embodiment of the present invention.

FIG. 5 is a flowchart illustrating a method for reassigning direction sensitive keys according to a preferred embodiment of the present invention. Referring to FIGS. 2A, 2B, 2C and 5, the process begins when an input event is detected (step 500), i.e., when the user presses an input key 226, 228. The device 200 determines whether the pressed key, i.e., 226, is a direction related button (step 502). If the pressed key is not a direction related button, i.e., the pressed key is an alphanumeric key or a select button 350 (FIG. 3A), the device 200 handles the input event (step 510), i.e., performs the command associated with the pressed key.

If the pressed key is a direction related button 226 (step 502), the sensor 232 determines the position of the panel 222 (step 504) and relays that information to the assigner 234. The assigner 234 then checks the directional assignment of the pressed input key 226 (step 506) and, if necessary, reassigns the key 226 to an opposite direction to maintain the directional aspect from the user's perspective (step 508). After the reassignment, the device 200 handles the input event (step 510), and awaits another input event (step 500).

Note that the layout 142 feature of the first embodiment can also be implemented in conjunction with the second embodiment. When the panel 222 is in the closed position and facing away from the user, the layout 142 of the input mechanisms 224, 226, 228 can be displayed automatically or upon request by the user.

Through aspects of the present invention, a plurality of input keys and mechanisms are relocated from the front face of the handheld electronic device to the back face and a layout of the input keys and mechanisms is displayed to a user on the front face. By locating the input keys and mechanisms on the back face, more or better features can be included on the front face facing the user. For instance, because fewer buttons are located on the front face, there is more space available for a larger display. Also, the button arrangement on the front face is less cluttered and the spacing between buttons can be increased so that the likelihood of pressing an incorrect button is decreased. Moreover, when input mechanisms are located on a swinging panel coupled to the device, the user can choose to operate the input mechanisms in more than one position. According to the preferred embodiment of the present invention, the directional aspects of direction related mechanisms are correlated to the user's perspective when the user is viewing the front face. Accordingly, regardless of the panel's position, the direction related keys remain intuitive to the user.

Although the present invention has been described in accordance with the embodiment shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the appended claims.

I claim:

1. A handheld device comprising: an input mechanism configured for detecting activation of one of at least two direction-related keys on a rotatable panel of a handheld device, wherein the activation is based on user input for navigating a display of the handheld device; a sensor configured for detecting a rotation-based position of the rotatable panel about a hinge mechanism of the handheld device; and an assigner configured for assigning a different direction to the direction-related key based on the rotation-based position of the rotatable panel.

2. The handheld device of claim 1, wherein the handheld device is configured to display a key layout representing the at least two direction-related keys on the display responsive to user input.

3. The handheld device of claim 2, wherein at least one of the at least two direction-related keys are responsive to a first pressure and a second pressure, wherein the first pressure is less than the second pressure and the key layout is displayed responsive to user input via the at least one of the at least two direction-related keys at the first pressure.

4. The handheld device of claim 3, wherein the displayed key layout highlights the at least one input key pressed at the first pressure.

5. The handheld device of claim 4, wherein the key layout is removed from the display when the user presses at least one of the at least two direction-related keys at the second pressure.

6. The handheld device of claim 1, wherein each of the at least two direction-related keys includes a pattern for identifying the key.

7. A method for reassigning direction-related keys in a handheld device, the method comprising: detecting activation of one of at least two direction-related keys on a rotatable panel of a handheld device, wherein the activation is based on user input for navigating a display of the handheld device; detecting a rotation-based position of the rotatable panel about a hinge mechanism of the handheld device; and assigning a different direction to the direction-related key based on the rotation-based position of the rotatable panel.

8. The method of claim 7, comprising displaying a key layout representing the at least two direction-related keys on the display responsive to user input.

9. The method of claim 8, comprising displaying the key layout responsive to user input at a first pressure applied to at least one of the at least two direction-related keys.

10. The method of claim 9 comprising highlighting on the key layout the at least one input key of the at least two direction-related keys having the first pressure applied to it.

11. The method of claim 10 comprising removing the key layout from the display when a second pressure is applied to the at least one of the at least two direction-related keys.

* * * * *